3,205,268
PREPARATION OF UNSYMMETRICAL DISULFIDES
Robert H. Rosenwald, Western Springs, Ill., assignor to Universal Oil Products Company, Des Plaines, Ill., a corporation of Delaware
No Drawing. Filed July 30, 1962, Ser. No. 213,090
5 Claims. (Cl. 260—608)

This invention relates to a novel method of preparing unsymmetrical disulfides.

Disulfides have utility in various fields. For example, certain dialkyl disulfides possess physiological activity including inducing paralysis in the respiration of rats, exerting lipotropic effect when administered peritoneally to young rats, antiseptic properties, etc. Disulfides possess activity as stabilizers for certain organic substances as, for example, stabilizer for pure hydrocarbons, stabilizer for petroleum wax, etc. Disulfides have been proposed for use as catalysts for certain reactions as, for example, as catalyst for the addition of thioacetic acid to vinyl fluoride, etc. Disulfides also are used in the reclaiming of rubber.

In some cases the disulfides or the mercaptans available for preparing the disulfides are not optimum for the desired use. For example, dimethyl disulfide is soluble in aqueous menstruum and, therefore, when this property is not desired, it would be of advantage to convert the methyl mercaptan into an unsymmetrical disulfide which will not be soluble in the aqueous menstruum. In other cases, the available disulde or mercaptan does not possess the desired molecular weight, boiling point, etc., and also, in such cases, it may be desirable to prepare the unsymmetrical disulfide from the available mercaptans to produce an unsymmetrical disulfide which meets the desired specifications.

Another advantage of the present invention is that the oxidation of the less reactive mercaptan is accelerated. In other words, the less reactive mercaptan is brought into reaction at an increased rate due to the presence of the more readily oxidized mercaptan. For example, the presence of ethyl mercaptan increases the rate of oxidation of tertiary-butyl mercaptan or tertiary-octyl mercaptan. Thus, for example, a more readily oxidized mercaptan, such as ethyl mercaptan or propyl mercaptan, is commingled with a heavy oil containing high boiling and less reactive mercaptans to thereby form the unsymmetrical disulfide. This will effect more complete reaction of the high boiling mercaptan and is significant in commercial processes designed to effect oxidation of high boiling mercaptans.

In one embodiment the present invention relates to a method of preparing an unsymmetrical disulfide which comprises reacting a mixture of at least two different mercaptans with an oxidizing agent in the presence of a phthalocyanine catalyst.

In a specific embodiment the present invention relates to a method of preparing ethyl tertiary-butyl disulfide by reacting a mixture of ethyl mercaptan and tertiary-butyl mercaptan with air in the presence of cobalt phthalocyanine sulfonate catalyst.

From the hereinbefore embodiments, it will be seen that the present invention relates to a novel method of preparing unsymmetrical disulfides. This reaction is surprising because normally it would be expected that the more reactive mercaptan would react preferentially to form the symmetrical disulfide and then the less reactive mercaptan would react to form a different symmetrical disulfide. However, it has been found that in the presence of the phthalocyanine catalyst, the unsymmetrical disulfides are formed and, as hereinbefore set forth, offer advantages in many cases.

Any mixture of mercaptans may be reacted in accordance with the present invention to form the unsymmetrical disulfides. Aliphatic mercaptans include methyl mercaptan, ethyl mercaptan, propyl mercaptan, butyl mercaptan, pentyl mercaptan, hexyl mercaptan, heptyl mercaptan, octyl mercaptan, nonyl mercaptan, decyl mercaptan, undecyl mercaptan, dodecyl mercaptan, tridecyl mercaptan, tetradecyl mercaptan, pentadecyl mercaptan, hexadecyl mercaptan, heptadecyl mercaptan, octadecyl mercaptan, nonadecyl mercaptan, eicosyl mercaptan, etc. Cyclic mercaptans include thiophenyl, thiocresol, thioxylenol and other alkylthiophenols, thionaphthol, alkylthionaphthols, cyclopropyl mercaptan, cyclobutyl mercaptan, cyclopentyl mercaptan, cyclohexyl mercaptan, cycloheptyl mercaptan, cyclooctyl mercaptan, etc.

In another embodiment of the invention the mercaptan may contain substituents having oxygen and/or nitrogen. Illustrative examples of such compounds include mercaptoethanol, mercaptopropanol, mercaptobutanol, mercaptopentanol, mercaptohexanol, etc., thioglcyolic acid, thiohydracrylic acid, thiosabinic acid, thiojuniperic acid, thiojalopinolic acid, etc., mercaptomalonic acid, mercaptosuccinic acid, mercaptoglutaric acid, mercaptoadipic acid, mercaptopimelic acid, mercaptosuberic acid, mercaptoazelai acid, mercaptosebacic acid, cysteine, etc.

As hereinbefore set forth, a mixture of at least two different mercaptans is reacted to form an unsymmetrical disulfide. Accordingly, two different mercaptans, preferably selected from those hereinbefore set forth, are reacted in the manner herein set forth to form the unsymmetrical disulfide. Illustrative examples include the reaction of ethyl mercaptan and tertiary-butyl mercaptan to form ethyl tertiary-butyl disulfide, the reaction of propyl mercaptan and tertiary-octyl mercaptan to form propyl tertiary-octyl disulfide, the reaction of tertiary-butyl mercaptan and thiophenol to form tertiary-butyl phenyl disulfide, the reaction of thiophenol and thiocresol to form phenyl cresyl disulfide, etc.

The reaction of the mixture of mercaptans is effected in the presence of an oxidizing agent and a phthalocyanine catalyst. Any suitable oxidizing agent may be employed. Air is particularly preferred, although free oxygen may be employed when desired.

Any suitable phthalocyanine catalyst may be used in accordance with the present invention and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, nickel phthalocyanine, molybdenum phthalocyanine, chromium phthalocyanine, tungster phthalocyanine, etc. The metal phthalocyanine, in general, is not readily soluble in aqueous solvents and, therefore, when used in an aqueous alkaline solution or for ease of compositing with a solid carrier, a derivative of the phthalocyanine is preferred. A particularly preferred derivative is the sulfonated derivative. Thus, an especially preferred phthalocyanine catalyst is cobalt phthalocyanine sulfonate. Such a catalyst is available commercially and comprises cobalt phthalocyanine disulfonate and also contains cobalt phthlocyanine monosulfonate. Another preferred catalyst comprises vanadium phthalocyanine sulfonate. These compounds may be obtained from any suitable source or prepared in any suitable manner as, for example, by reacting cobalt or vanadium phthalocyanine with 25–50% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

In one embodiment the phthalocyanine catalyst is used in the presence of an alkaline reagent. Any suitable alkaline reagent may be used and preferably comprises sodium hydroxide (caustic) or potassium hydroxide. Other alkaline reagents include lithium hydroxide, rubidium hydroxide, cesium hydroxide, etc., although, in general, these hydroxides are more expensive and, therefore, generally are not preferred for commercial use. Other alkaline reagents include sodium phosphate, potassium phosphate, sodium borate, potassium borate, ammonium hydroxide, etc. The alkaline reagent preferably is prepared as an aqueous solution, which may range, for example, from about 1% to about 50% and preferably from about 5% to about 25% by weight concentration of the alkaline reagent. While aqueous solutions are preferred, it is understood that other suitable solvents may be used including, for example, alcohols, ketones, etc., or mixtures thereof, either as such or diluted with water.

In one embodiment the phthalocyanine catalyst is utilized as a solution in a suitable solvent. In a particularly preferred method, the phthalocyanine catalyst is prepared as a solution in the alkaline reagent. In another embodiment the phthalocyanine catalyst is composited with a solid carrier and used as finely divided particles in a slurry type operation. Any suitable carrier may be employed, charcoal being particularly preferred. Illustrative charcoals include bone char, wood charcoal, charcoal made from coconut or other nut shells, fruit pits, etc. Other carriers include coke, silica, alumina, silica-alumina composites, etc., which either may be synthetically prepared or naturally occurring, the latter usually being activated by acid, heat or other treatment. When the phthalocyanine catalyst is composited with the carrier, this may be prepared in any suitable manner such as by dipping, suspending, immersing, etc., particles of the solid carrier in a solution containing the phthalocyanine catalyst, or the solution may be sprayed, poured or otherwise contacted with the carrier. In a preferred embodiment the solid carrier is formed into particles of uniform or irregular size and shape prior to compositing with the phthalocyanine catalyst. In still another embodiment the solid composite of phthalocyanine catalyst and carrier is utilized as a fixed bed in a reaction zone.

The reaction of the mixture of mercaptans is effected at any suitable temperature which generally will range from about atmospheric to moderate elevated temperature which generally will not exceed about 200° F. Although atmospheric pressure may be employed, it generally is preferred to utilize super-atmospheric pressure which may range from 5 to 1000 pounds or more and generally from 5 to 200 p.s.i.g., particularly in continuous process flow. When super-atmospheric pressure is employed, a higher temperature may be used which generally will not exceed about 500° F.

The reaction of the mixture of mercaptans is effected in any suitable manner, which may be either batch or continuous and which may use either the catalyst dissolved in an alkaline solution or the catalyst in the form of solid particles. In a batch type operation, the reactants and catalyst are disposed in a suitable reaction vessel preferably equipped with a suitable mixing device to obtain intimate mixing. While air or oxygen may be sealed into the reaction vessel, in another embodiment the air or oxygen may be introduced continuously into the reaction vessel. Also, when desired, one or both of the mercaptans may be supplied continuously or intermittently to the reaction vessel, preferably being bubbled through a body of the catalyst solution. When the phthalocyanine catalyst is used in the form of a soltuion in alkaline reagent, the phthalocyanine catalyst is used in a concentration of from about one part per million to as high as 25% or more by weight of the alkaline reagent. However, as another advantage of the process of the present invention, the phthalocyanine catalyst is very active and, therefore, generally is used in a concentration of from about 10 to about 500, and in some cases, up to 1000 parts per million based on the alkaline reagent.

In a continuous type process, when using the phthalocyanine catalyst dissolved in an alkaline solution, the reactants, catalyst and/or oxidizing agent may be passed concurrently or countercurrently in a continuous flow in a reaction zone. In a specific method, the mercaptans and catalyst are introduced into the upper portion of a reaction vessel and oxygen is introduced at a lower portion of the vessel. The total effluent from the reaction zone is withdrawn and allowed to separate in subsequent settling equipment. Another method is to pass the mercaptans, catalyst solution and oxygen upwardly through orifice mixers or other suitable reaction vessel and then withdraw the total reaction mixture from the reaction zone and separate the same in subsequent settling equipment. In a fixed bed type of process the mercaptans, alkaline solution and air are passed, in either upward or downward flow, through a fixed bed of the catalyst and then the reaction mixture is allowed to separate in subsequent settling equipment.

In the settling equipment excess air is vented from the process or recycled to the reaction zone, and an upper disulfide layer separates from a lower aqueous alkaline solution layer. The unsymmetrical disulfide is withdrawn and recovered as the desired product of the process. The alkaline solution, which may or may not contain the phthalocyanine catalyst, preferably is recycled for further use in the process.

In some cases, the presence of hydrocarbons in the reaction zone is detrimental to the formation of the desired unsymmetrical disulfides. Accordingly, in such instances, the reaction should be effected in the absence of added hydrocarbons.

The following examples are introduced to illustrate further the novelty and utility of the present invention but not with the intention of unduly limiting the same.

*Example I*

This example illustrates the preparation of ethyl tertiary-butyl disulfide by the reaction of ethyl mercaptan and tertiary-butyl mercaptan. The reaction was effected in a three liter three necked flask equipped with a motor driven stirrer. Two hundred parts per million of cobalt phthalocyanine disulfonate catalyst were dissolved in caustic solution containing 1% by weight of sodium hydroxide. The mixture of mercaptans and catalyst solution were supplied to the reaction flask and oxygen was introduced through a glass tube inserted into the reaction mixture. 0.442 g. of the phthalocyanine catalyst and 22 g. of sodium hydroxide dissolved in 2183 g. of water, 15.2 g. (0.25 mole) of ethyl mercaptan and 22.4 g. (0.25 mole) of tertiary-butyl mercaptan were supplied to the reaction flask, and oxygen then was introduced thereto. The reaction was effected at room temperature but increased about 5° C. After a reaction time of 0.5 hour, 93.1% of the unsymmetrical ethyl tertiary-butyl disulfide was recovered. Inspection of the product was made by gas-liquid chromatography and by infra-red spectroscopy.

*Example II*

This run was made in substantially the same manner as described in Example I, except that the mercaptans used were tertiary-butyl mercaptan and thiophenol. 0.44 g. of cobalt phthalocyanine disulfonate catalyst and 22.1 g. of sodium hydroxide were dissolved in 2182 g. of water. 22.4 g. (0.25 mole) of tertiary-butyl mercaptan and 28.5 g. (0.26 mole) of thiophenol were supplied to the reaction flask and oxygen then was supplied thereto. Here again, the reaction was initiated at room temperature but rose approximately 5° C. 84.9% by weight of unsymmetrical tertiary-butyl phenyl disulfide was recovered.

*Example III*

This example describes the preparation of ethyl tertiary-octyl disulfide by the reaction of ethyl mercaptan and tertiary-octyl mercaptan. The reaction was effected in substantially the same manner as described in Example I, using 0.25 mole of each of the mercaptans. Ethyl tertiary-octyl disulfide was recovered as the major product of the process.

*Example IV*

Another run, similar to that described in Example III, was made in the presence of benzene. As hereinbefore set forth, in some cases the presence of hydrocarbons is detrimental in the reaction and this is evidenced in the run of this example which was effected in the presence of benzene. The yield of unsymmetrical ethyl tertiary-octyl disulfide in this run was considerably lower than obtained in the run of Example III.

*Example V*

Hydroxyethyl ethyl disulfide is prepared by the reaction of mercaptoethanol and ethyl mercaptan in substantially the same manner as described in Example I. The reaction is effected at room temperature and, here again, an increase of about 5° C. in temperature occurs.

*Example VI*

Ethyl phenyl disulfide is prepared by reacting equal mole proportions of ethyl mercaptan and thiophenol at room temperature in the presence of vanadium phthalocyanine trisulfonate catalyst dissolved in an aqueou solution of 5° Baumé potassium hydroxide.

*Example VII*

The unsymmetrical disulfide of cysteine and tertiary-butyl mercaptan is prepared by reacting cysteine and tertiary-butyl mercaptan at room temperature in the presence of a fixed bed of cobalt phthalocyanine catalyst deposited on charcoal. The catalyst is disposed as a fixed bed in a reaction vessel and the cysteine, tertiary-butyl mercaptan, potassium hydroxide solution and air are passed upwardly through the catalyst. The reaction mixture then is passed into a settling zone, wherein excess air is vented from the process. The disulfide is recovered as the desired product of the process, while the potassium hydroxide solution is recycled for further use in the process.

I claim as my invention:

1. A method of preparing an unsymmetrical disulfide which comprises forming a reaction mixture consisting essentially of at least two different mercaptans, one of which is higher boiling than the other, and oxidizing the resultant mixture with oxygen in the presence of a metal phthalocyanine catalyst in which the metal is selected from the group consisting of cobalt, vanadium, iron, copper, nickel, molybdenum, chromium and tungsten.

2. The method of claim 1 further characterized in that the phthalocyanine component of said catalyst is cobalt phthalocyanine sulfonate.

3. The method of claim 1 further characterized in that the phthalocyanine component of said catalyst is vanadium phthalocyanine sulfonate.

4. The method of claim 1 further characterized in that the low boiling mercaptan is ethyl mercaptan and the higher boiling mercaptan is tertiary-butyl mercaptan.

5. The method of claim 1 further characterized in that the low boiling mercaptan is ethyl mercaptan and the higher boiling mercaptan is tertiary-octyl mercaptan.

References Cited by the Examiner

UNITED STATES PATENTS

| | | | |
|---|---|---|---|
| 2,474,849 | 7/49 | Kleiman | 260—608 |
| 2,853,432 | 9/58 | Gleim et al. | 208—284 |
| 2,921,021 | 1/60 | Urban et al. | 208—205 |
| 3,039,855 | 6/62 | Urban | 260—608 |

OTHER REFERENCES

Small et al., J. Amer. Chem. Soc. 69, 1710–1713 (1947).

CHARLES B. PARKER, *Primary Examiner.*

DANIEL D. HORWITZ, *Examiner.*